United States Patent [19]

Duncan

[11] 3,737,144

[45] June 5, 1973

[54] BUTTERFLY VALVE
[75] Inventor: Leon L. Duncan, Washington, Mo.
[73] Assignee: Zero Manufacturing Company, Washington, Mo.
[22] Filed: Feb. 9, 1972
[21] Appl. No.: 224,770

[52] U.S. Cl. ............251/307, 285/365, 285/373, 138/99
[51] Int. Cl. .............................................F16k 1/22
[58] Field of Search.............251/307, 306, 308, 251/173, 315, 148, 152, 170; 287/1; 138/99; 285/367, 336, 365, 373; 137/454.2, 454.6

[56] References Cited
UNITED STATES PATENTS

| | | | |
|---|---|---|---|
| 763,191 | 6/1904 | Marvin | 138/99 |
| 2,338,759 | 1/1944 | Fortune | 251/148 X |
| 3,048,363 | 8/1962 | Garrigan | 251/307 |
| 3,424,430 | 1/1969 | Hoelsch | 251/148 |
| 3,476,410 | 11/1969 | Pastva, Jr. | 285/365 X |
| 3,598,365 | 8/1971 | Werra | 251/307 |

Primary Examiner—Henry T. Klinksiek
Assistant Examiner—Robert J. Miller
Attorney—Penrose Lucas Albright and William B. Mason

[57] ABSTRACT

A butterfly valve has a turntable disc within a resilient, tubular seat member, the latter forming part of a conduit. The entire unit can be quickly disassembled for cleaning by detaching a segmented clamp which normally connects the tubular member with circular couplers at each side of the seat member. The couplers have grooves to receive raised ribs on each side of the tubular seat so that a tight seal can be formed. The clamp compresses the resilient tubular seat to insure a seal for the disc when the latter is turned to close the valve.

9 Claims, 8 Drawing Figures

PATENTED JUN 5 1973 3,737,144

BUTTERFLY VALVE

The present invention is concerned with butterfly valve assembly that can be quickly taken apart for cleaning or repairing. The subject valve assembly finds particular use in the food processing industry, including milk lines and conduits, where sanitation necessitates frequent cleaning and/or inspection.

It is an object of the present invention to provide a dependable butterfly valve assembly for fluid conduits which can be quickly disassembled for cleaning and/or repair. These and other objects will be apparent from the below description and appended drawings, in which.

Figures 1, 2:
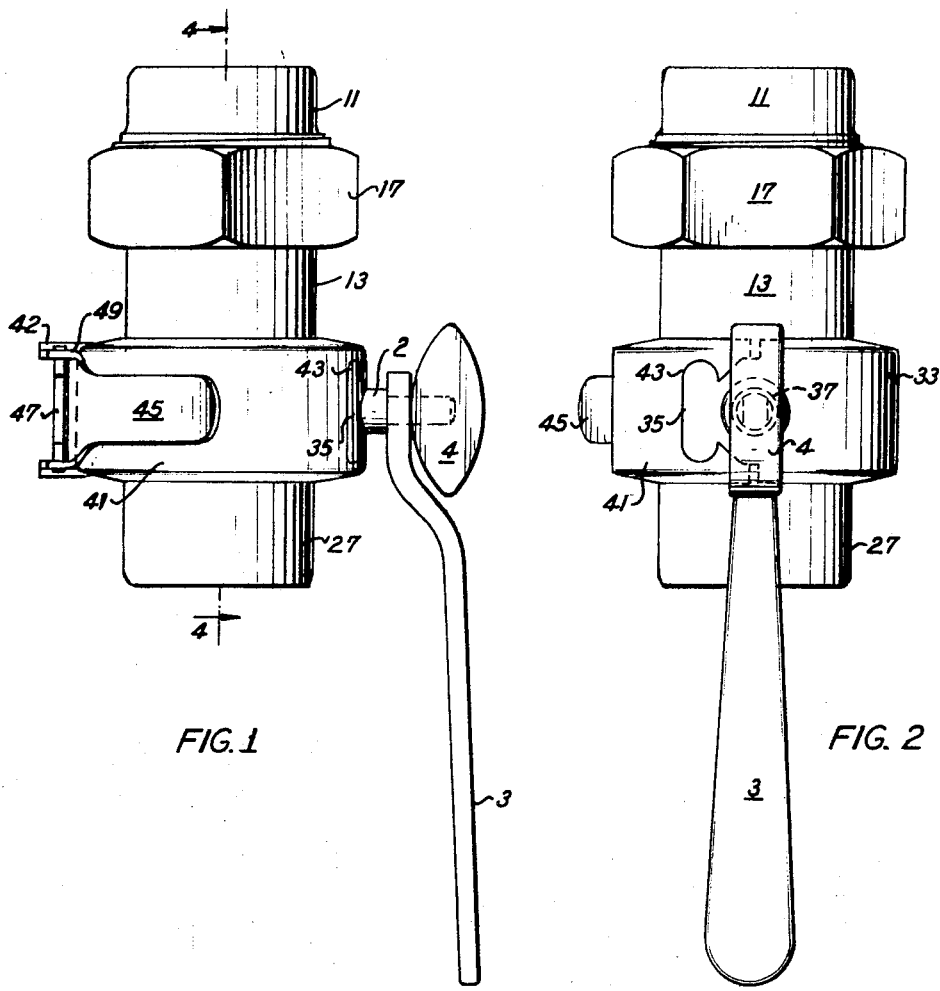
FIG. 1 is a side elevation of the entire valve assembly in upright position.
FIG. 2 is a plan view of the FIG. 1 valve assembly.
Figures 7, 8:
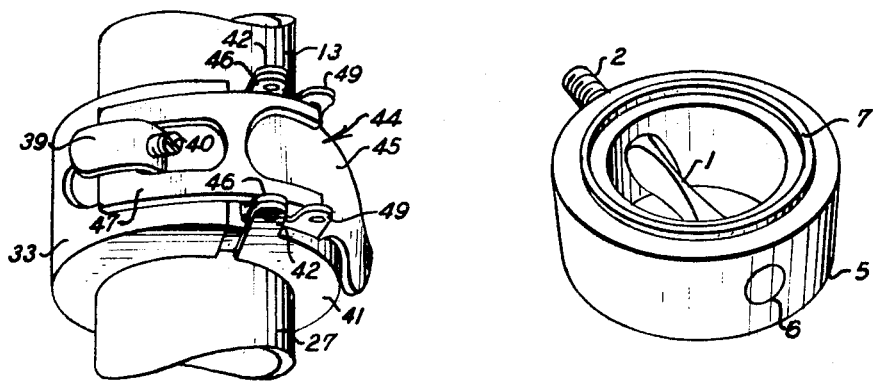
FIG. 7 is a prospective view of the collar clamp toggle.
FIG. 8 is a prospective view of the resilient tubular member which seats the valve.
Figure 4:
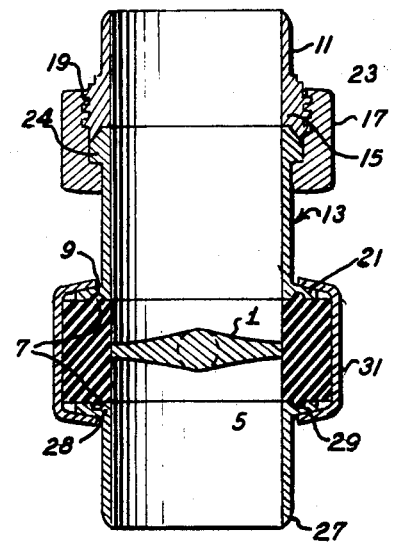
FIG. 4 is a section view taken along the lines of 4-4 in FIG. 1 with the handle omitted.
Figure 5:
FIG. 5 is a section view taken along the lines 5—5 of FIG. 3 with the handle omitted.
Figure 5:
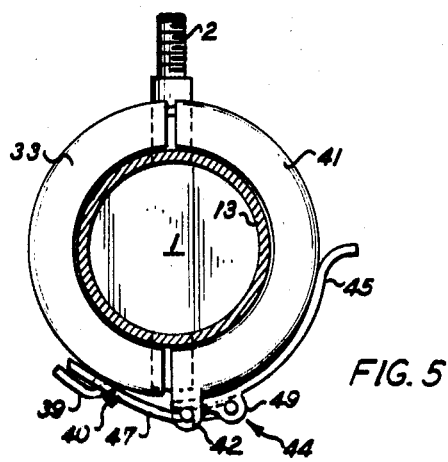

The valve disc 1 is turnably mounted in a resilient tubular member 5, best shown in FIG. 8. The tubular member 5 forms part of the conduit being valved as illustrated in FIG. 4. The member 5 can be made of rubber or equivalent resilient material; the other parts of the valve assembly including the disc 1, can be made of stainless steel or other corrosion resistant material that meets sanitary standards.

The disc 1 is flattened at its sides and thickened at its top and bottom for ease of pivoting. The valve stem 2 is passed through holes 6 in the top and bottom of tubular member 5. By distorting the resilient member 5, the disc 1 can readily be separated from its seat. The member 5 has annular ribs 7 preferably concentric with the conduit which interfit and mate with grooves 9 and 29 of adjoining couplers 13 and 27 respectively.

The coupler 13 is shown as the upper coupler part in FIG. 4 and comprises a circular beveled flange 21 at its lower end, the upper surface of the flange 21 being sloped and the lower surface having a circular groove 9. The upper end of coupler 13 is flanged at 24 and slideably received in collar nut 17.

The other coupler 27 is flanged at 28 in a similar configuration to flange 21. of coupler 13, namely with a sloped outer surface and an inner surface provided with an annular groove 29, which receives a rib 7 of tubular member 5.

Figure 6:
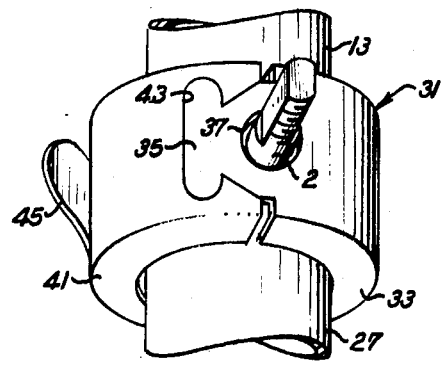
FIG. 6 is a prospective view of the collar clamp hinge with parts omitted.

A two part, quick release clamp 31 encircles tubular member 5 and the sloping inner surfaces of the clamp 31 draw the flanges 21 and 28 tight against the sides of the member 5 to effectively seal the joint. The clamp 31 comprises a first part or segment 33, one end of which has a tongue 35 that hinges in a conforming recess 43 of the second clamp part or segment 41 (FIG. 6).

The first part 33 also has a hole 37 through which valve stem 2 passes when the valve parts are assembled. The stem 2 is squared to receive a handle 3 with a square slot and threaded so that thumb nut 4 can lock the handle 3 to stem 2 for turning butterfly disc 1. At the opposite end of the first segment 33, an L-shaped stud 39 is formed as a purchase for a toggle connection 44 on the second segment 41.

The toggle connection 44 comprises an apertured leaf 47 pivoted to a pair of tags 49 on lever 45. A second pair of tags 46 on lever 45 receives pivot pins to turnably connect the lever 45 to upright ears 42 on second segment 41. Thus, to clamp the adjacent couplers 13 and 27 to the resilient tubular member 5, and seal the valve connections, the lever 45 is first raised. Then the aperture of leaf 47 is fitted over stud 39 and the lever 45 is depressed so that tags 49 cross over above the pivoted tags 46 and ears 42, drawing the segments 33 and 41 together.

Figure 3:
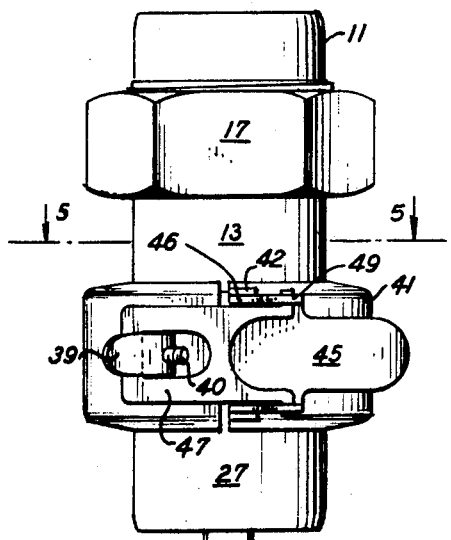
FIG. 3 is a bottom view of the FIG. 1 valve assembly.

Conversely, to disassemble the valve for cleaning or repair, the lever 45 is raised which moves leaf 47 to the left (FIG. 3) permitting the leaf 47 to be disengaged from stud 39. The segments 33 and 41 are then completely disconnected at their other ends by lifting tongue 35 from recess 43, allowing couplers 13 and 27 to be completely separated from tubular member 5.

It will be noted that as the toggle joint 44 is levered closed, the clamping parts or segments 33 and 41 compress the resilient tubular member 5 about disc 1 to ensure a seal. The degree of compression exerted on tubular member 5 can be varied by adjusting screw 40 threaded in a leg of stud 39 and against which the apertured leaf bears when the segments 33 and 41 are toggled together.

Removal of the valve assembly from the conduit is accomplished by unscrewing the threads 19 of collar 17 from coupler sleeve 11. The threaded end 15 of sleeve 11 is beveled to receive the flanged end 24 of coupler 13 in a locking relationship. When collar 17 is unscrewed from sleeve 11, the collar can be slid along coupler 13 and the sleeve removed, whereupon the remainder of the valve assembly can be removed from a conduit.

What is claimed is:

1. A butterfly valve for quick disassembly comprising a turnable disc mounted within a resilient tubular member to comprise a valved conduit, releasable clamp means encircling the outer dimensions of said tubular member, said clamp means comprising two hinged together segments connected by toggle means for pulling said parts together and compressing said tubular member.

2. The valve of claim 1 wherein said conduit includes a circular coupler on each side of said resilient tubular member and the clamp means encircles a flange of each coupler against said tubular member.

3. The valve of claim 2 wherein said resilient tubular member has sides with raised ribs and each coupler has a groove which interfits with a rib when said valve body is assembled.

4. The valve of claim 3 wherein said raised ribs are concentric with said conduit.

5. The valve of claim 1 wherein said valve disc includes a stem which is passed through aperture means in said tubular member, said stem also extending through one of said segments to comprise a valve handle.

6. The valve of claim 5 wherein said valve disc is generally circular with thickened rounded opposite outer edges adjacent the aperture means in said tubular member.

7. The valve of claim 1 wherein said clamp means comprises two semi-circular segments which are hinged together at adjacent ends by a tongue and slot connection, the opposite ends of said segments being connected by a toggle joint.

8. The valve of claim 7 wherein said toggle joint includes a stud on a first segment and slot means for receiving said stud pivotably connected to the second segment.

9. The valve of claim 8 wherein a screw adjustment is associated with said stud to bear on said slot means when said segments are connected to one another whereby the amount of compression by said clamp means on said tubular member can be adjusted.

* * * * *